(12) United States Patent
Dick et al.

(10) Patent No.: US 6,422,013 B2
(45) Date of Patent: Jul. 23, 2002

(54) FLUID RESERVOIR SYSTEM FOR A MASTER CYLINDER

(75) Inventors: Jean-Marc Dick, Elmont; Dominique Pampirio, Puteaux, both of (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/815,245

(22) Filed: Mar. 22, 2001

(30) Foreign Application Priority Data

Apr. 7, 2000 (GB) .............................................. 0008498

(51) Int. Cl.$^7$ ................................................ B60T 11/26
(52) U.S. Cl. ...................................................... 60/585
(58) Field of Search .......................................... 60/585

(56) References Cited

U.S. PATENT DOCUMENTS

| | | | |
|---|---|---|---|
| 4,505,113 A | * | 3/1985 | Reinartz et al. .......... 60/585 X |
| 4,674,282 A | * | 6/1987 | Quiney et al. ............ 60/585 X |
| 5,349,820 A | * | 9/1994 | Yanagi et al. ............. 60/585 X |

* cited by examiner

Primary Examiner—John E. Ryznic
(74) Attorney, Agent, or Firm—Scott A. McBain

(57) ABSTRACT

A fluid reservoir system (10) for a master cylinder (12) having first and second fluid chambers each with associated pistons, the system comprising a main reservoir (16); a first secondary reservoir (18) for mounting on the master cylinder to supply fluid to the first fluid chamber; a second secondary reservoir (18) for mounting on the master cylinder to supply fluid to the second fluid chamber; a first fluid pipe (22) fluidly connecting the main reservoir with the first secondary reservoir; and a second fluid pipe (24) fluidly connecting the main reservoir with the second secondary reservoir; wherein the first secondary reservoir has a fluid capacity which is substantially equal to, or greater than, the capacity of fluid required by the first fluid chamber during full stroke of the associated master cylinder piston; and wherein the second secondary reservoir has a fluid capacity which is substantially equal to, or greater than, the capacity of fluid required by the second fluid chamber during full stroke of the associated master cylinder piston. Allows remote location of the main reservoir from the master cylinder.

6 Claims, 2 Drawing Sheets

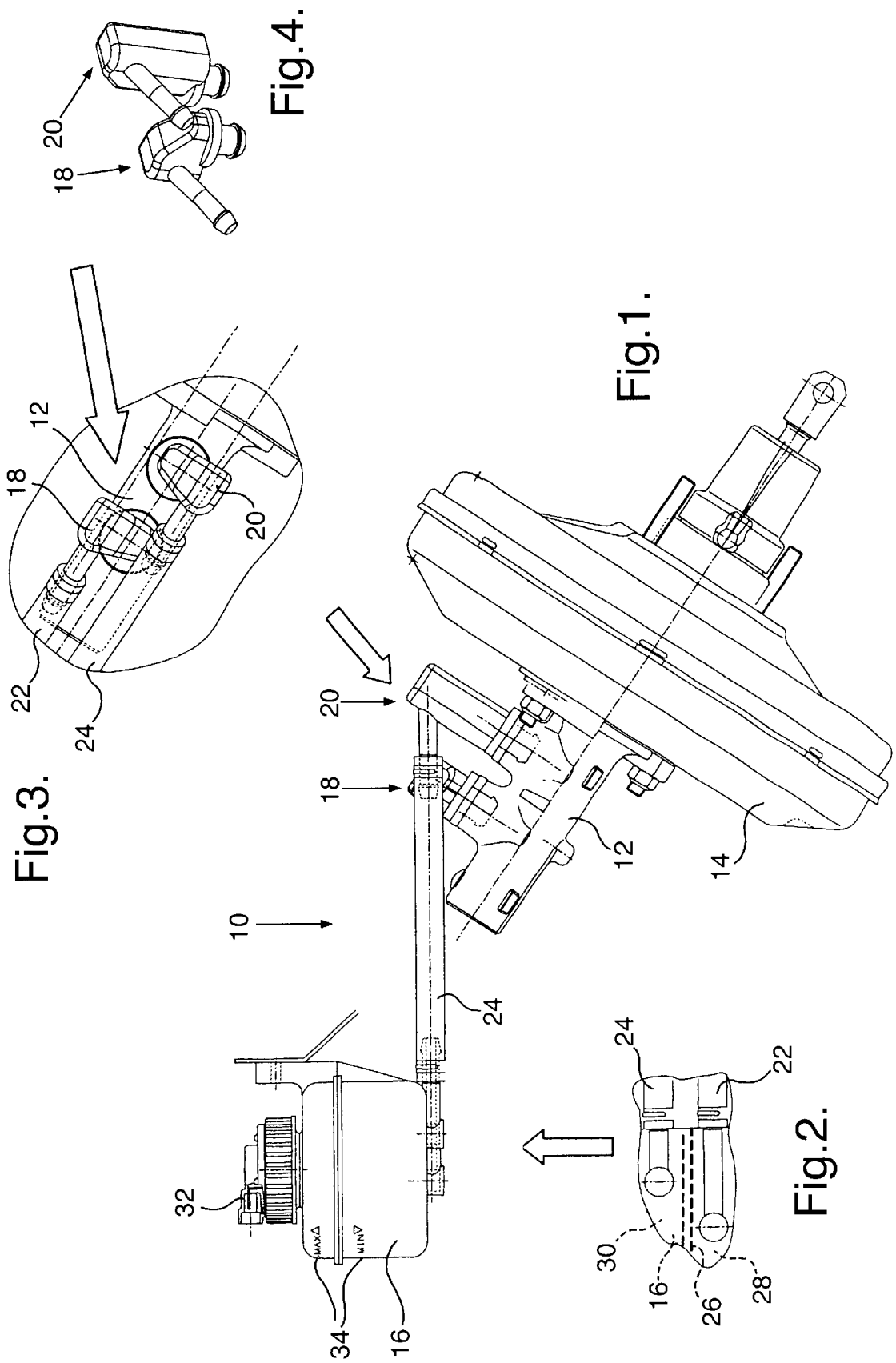

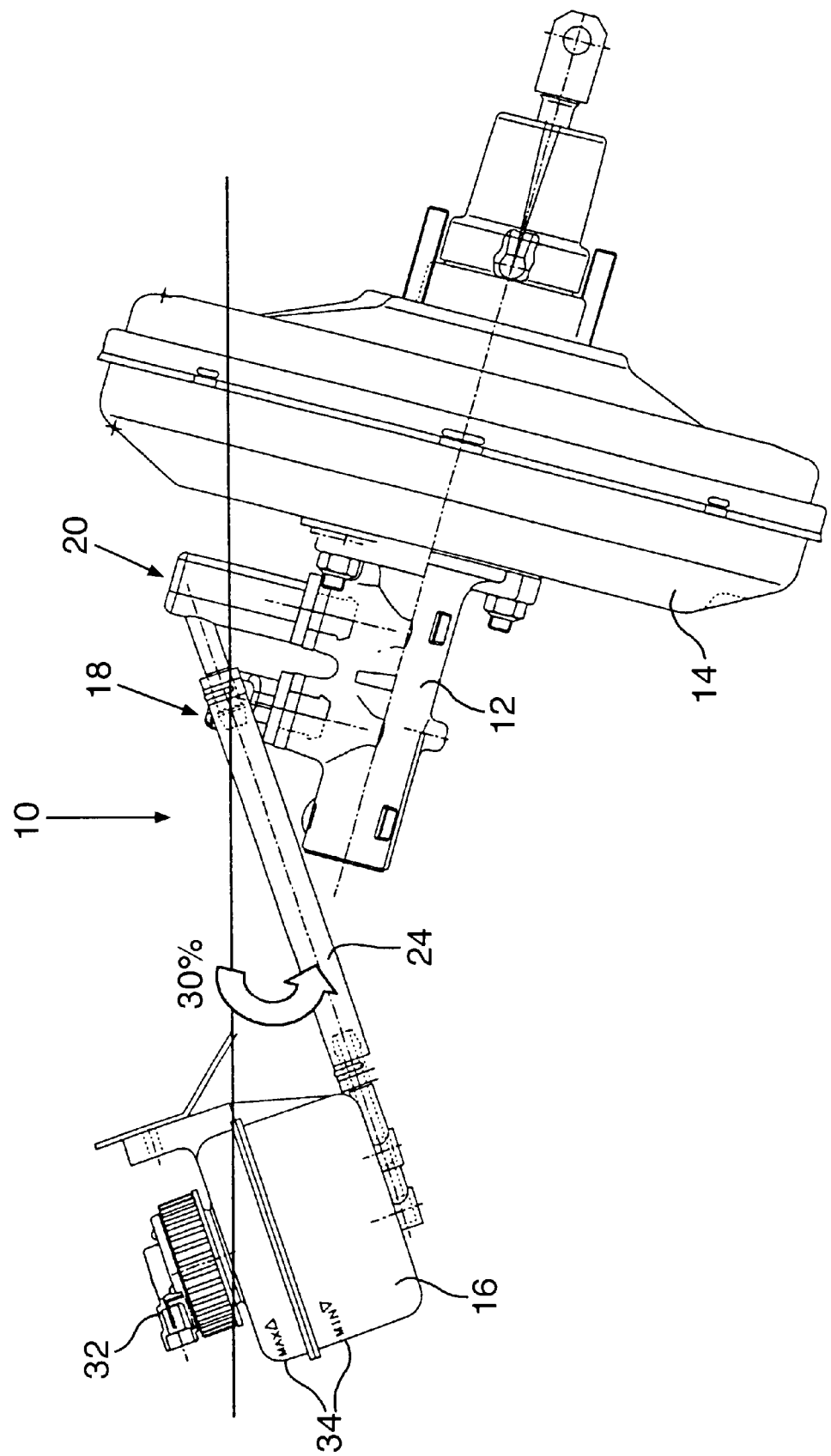

FLUID RESERVOIR SYSTEM FOR A MASTER CYLINDER

TECHNICAL FIELD

The present invention relates to a fluid reservoir system for a master cylinder, and in particular for a master cylinder of the braking system of a motor vehicle.

BACKGROUND OF THE INVENTION

In some motor vehicles, the master cylinder of the braking system is positioned just below a wall of the vehicle body. In such arrangements, it is difficult, if not impossible, to mount a fluid reservoir directly on the master cylinder. Where a fluid reservoir is mounted on the master cylinder in such a situation, it is difficult, if not impossible, to re-fill the reservoir and/or to view the fluid level markings on the reservoir. WO-A-99/17967 describes a fluid reservoir system in which the system comprises a main reservoir, a secondary reservoir (attachable to the master cylinder), and a fluid pipe connecting the two reservoirs.

SUMMARY OF THE INVENTION

The object of the present invention is to provide a fluid reservoir system which overcomes the above mentioned problems.

A fluid reservoir system in accordance with the present invention, for a master cylinder having first and second fluid chambers each with associated pistons, comprises a main reservoir; a first secondary reservoir for mounting on the master cylinder to supply fluid to the first fluid chamber; a second secondary reservoir for mounting on the master cylinder to supply fluid to the second fluid chamber; a first fluid pipe fluidly connecting the main reservoir with the first secondary reservoir; and a second fluid pipe fluidly connecting the main reservoir with the second secondary reservoir; wherein the first secondary reservoir has a fluid capacity which is substantially equal to, or greater than, the capacity of fluid required by the first fluid chamber during full stroke of the associated master cylinder piston; and wherein the second secondary reservoir has a fluid capacity which is substantially equal to, or greater than, the capacity of fluid required by the second fluid chamber during full stroke of the associated master cylinder piston.

The present invention provides a fluid reservoir system in which the main reservoir can be positioned remote from the master cylinder. Further, the size of the internal volumes of the secondary reservoirs is such as to provide an adequate supply of fluid to the master cylinder.

BRIEF DESCRIPTION OF THE DRAWINGS

The present invention will now be described, by way of example, with reference to the accompanying drawings, in which:

FIG. 1 is a side view of a fluid reservoir system in accordance with the present invention mounted on a master cylinder;

FIG. 2 is a view of part of the lower surface of the main reservoir of the system of FIG. 1;

FIG. 3 is a view of part of the upper surface of the first and second secondary reservoirs of the system of FIG. 1;

FIG. 4 is a perspective view of the first and second secondary reservoirs of the system of FIG. 1; and FIG. 5 is a side view of the fluid reservoir system of FIG. 1 when at an angle of approximately 30 degrees to the horizontal.

DESCRIPTION OF THE PREFERRED EMBODIMENT

Referring to the drawings, the fluid reservoir system 10 is for mounting on a master cylinder 12 of the braking system of a motor vehicle in which the master cylinder has first and second separate fluid chambers (not shown) for providing pressurised brake fluid to two separate brake lines in the vehicle. The master cylinder 12 is attached to a brake booster 14 of the braking system. The fluid reservoir system 10 comprises a main reservoir 16, a first secondary reservoir 18, a second secondary reservoir 20 which is fluidly separate from the first secondary reservoir, and first and second fluidly separate fluid pipes 22, 24. The first secondary reservoir 18 is mounted on the master cylinder 12 to supply brake fluid to the first fluid chamber in the master cylinder. The second secondary reservoir 20 is mounted on the master cylinder 12 to supply brake fluid to the second fluid chamber in the master cylinder.

The main reservoir 16 has an internal wall 26 separating first and second fluid reservoirs 28, 30 inside the main reservoir. The first fluid pipe 22 fluidly connects the first fluid reservoir 28 of the main reservoir 16 with the first secondary reservoir 18. The second fluid pipe 24 fluidly connects the second fluid reservoir 30 of the main reservoir 16 with the second secondary reservoir 20. The main reservoir 16 also includes a fluid level sensor 32, and marks 34 indicating maximum and minimum fluid levels.

The first secondary reservoir 18 has an internal volume or capacity for brake fluid which is substantially the same as, or more than, the volume of brake fluid required by the first fluid chamber of the master cylinder 12 during a full stroke of the associated master cylinder piston (not shown). The second secondary reservoir 20 has an internal volume or capacity for brake fluid which is substantially the same as, or more than, the volume of brake fluid required by the second fluid chamber of the master cylinder 12 during full stroke of the associated master cylinder piston.

For ease of assembly to the master cylinder 12, the first and second secondary reservoirs 18, 20 are preferably separately formed. Also, for ease of assembly, the first and second fluid pipes 22, 24 are preferably separately formed. The second secondary reservoir 20 is located further from the main reservoir 16 than the first secondary reservoir 18, and preferably has a greater internal volume than the first secondary reservoir.

In use, when the vehicle is travelling in a horizontal direction, the main reservoir 16 is positioned to be substantially horizontal with, or above, the first and second secondary reservoirs 18, 20 (FIG. 1). When the vehicle is travelling downhill, the main reservoir 16 is positioned below the first and second secondary reservoirs 18, 20 (FIG. 5). However, because of the size of the internal volumes of the first and second secondary reservoirs 18, 20, brake fluid is substantially always available to the master cylinder 12.

The present invention has the advantages of providing a fluid reservoir system for a master cylinder in which the main reservoir is readily accessible for re-filling, the fluid level marks are easily visible, and the system is easy to install. Further, the size of the internal volumes of the secondary reservoirs is such as to provide an adequate supply of fluid to the master cylinder substantially irrespective of the vehicle angle to the horizontal. Still further, the separation of the fluid passages between the main reservoir to the master cylinder provides security should one of the fluid passages, or one of the vehicle brake lines, develop a leak and/or fail.

What is claimed is:

1. A fluid reservoir system for a master cylinder having first and second fluid chambers each with associated pistons, the system comprising a main reservoir; a first secondary reservoir for mounting on the master cylinder to supply fluid to the first fluid chamber; a second secondary reservoir for mounting on the master cylinder to supply fluid to the second fluid chamber; a first fluid pipe fluidly connecting the main reservoir with the first secondary reservoir; and a second fluid pipe fluidly connecting the main reservoir with the second secondary reservoir; wherein the first secondary reservoir has a fluid capacity which is substantially equal to, or greater than, the capacity of fluid required by the first fluid chamber during full stroke of the associated master cylinder piston; and wherein the second secondary reservoir has a fluid capacity which is substantially equal to, or greater than, the capacity of fluid required by the second fluid chamber during full stroke of the associated master cylinder piston.

2. A fluid reservoir system as claimed in claim 1, wherein the first and second secondary reservoirs are separately formed.

3. A fluid reservoir system as claimed in claim 1 or claim 2, wherein the first and second fluid pipes are separately formed.

4. A fluid reservoir system as claimed in any one of claims 1 to 3, wherein the second secondary reservoir has a fluid capacity which is greater than the fluid capacity of the first secondary reservoir.

5. A fluid reservoir system as claimed in any one of claims 1 to 4, wherein the main reservoir has an internal wall defining separate first and second fluid reservoirs; and wherein the first fluid pipe is fluidly connected with the first fluid reservoir and the second fluid pipe is fluidly connected with the second fluid reservoir.

6. A fluid reservoir system as claimed in any one of claims 1 to 5, wherein a fluid level sensor is mounted in the main reservoir.

* * * * *